Nov. 18, 1952 — L. R. MANSELL — 2,618,047
LENGTH CONTROL APPARATUS
Filed April 9, 1948 — 4 Sheets-Sheet 1

INVENTOR
LELAND R. MANSELL
BY
ATTORNEY

Nov. 18, 1952     L. R. MANSELL     2,618,047
LENGTH CONTROL APPARATUS
Filed April 9, 1948     4 Sheets-Sheet 2

INVENTOR
LELAND R. MANSELL
BY *George N. Hibbet*
ATTORNEY

Nov. 18, 1952     L. R. MANSELL     2,618,047
LENGTH CONTROL APPARATUS
Filed April 9, 1948     4 Sheets-Sheet 3

INVENTOR
LELAND R. MANSELL
BY *(signature)*
ATTORNEY

Nov. 18, 1952     L. R. MANSELL     2,618,047
LENGTH CONTROL APPARATUS

Filed April 9, 1948     4 Sheets-Sheet 4

INVENTOR
LELAND R. MANSELL
BY
ATTORNEY

Patented Nov. 18, 1952

2,618,047

UNITED STATES PATENT OFFICE 2,618,047

LENGTH CONTROL APPARATUS

Leland R. Mansell, Poland, Ohio

Application April 9, 1948, Serial No. 20,147

7 Claims. (Cl. 29—69)

This invention is directed to the provision of apparatus for insuring cutting moving stock such as pipe, tubing, rods and the like into pieces of substantially predetermined length as the stock is progressively generated in a continuous mill or other apparatus, the invention also including further objects and novel features of design, construction and arrangement as will hereinafter more fully appear.

As it is particularly adapted for use in connection with the severing of butt weld pipe after its formation in a continuous butt weld mill, I shall describe the invention more especially when utilized for that purpose but not by way of limitation or restriction thereto as it may be employed advantageously for many other purposes if desired. It will moreover be understood that the term "pipe" is herein used in a generic sense to indicate any elongated generally like material such as rods or tubes as well as the class of goods specifically known as pipe.

Butt weld pipe as produced on a continuous mill is delivered from the latter at high speed and is usually cut into separate lengths at a point relatively close to that of its exit from the mill by some appropriate mechanism such as a reciprocable flying saw adapted for rectilinear movement parallel to the path of the pipe and thus of the general character of that disclosed in U. S. Patent 1,946,926, granted February 13, 1934 to J. M. Barton, and in my prior application for U. S. Letters Patent for Length Control Apparatus, Serial No. 790,516, filed December 9, 1947, I have disclosed and claimed means for accurately controlling the length of pipe sections cut by a saw of that character. The invention forming the subject of the present application is, however, directed to apparatus for controlling the length of sections cut by a saw operating in a different manner.

Thus the present invention relates more particularly to length control apparatus in association and combination with a saw movable in a substantially planetary orbit adjacent the path of the pipe rather than one reciprocable along a rectilinear path and is especially directed to means for regulating in accordance with the speed of generation of the pipe the rate of travel of the saw in its orbit and consequent timing of successive attacks by the saw upon the pipe to sever it.

While saws of this general type have been suggested as offering certain advantages over the reciprocable ones, there have been available no satisfactory means for insuring accurate coordination of the orbital speed and timing of the saw travel with the speed of the pipe, particularly when the latter is generated at speeds of the order of 500 linear feet per minute and more as in modern continuous mills, since the speed of generation inevitably fluctuates from time to time from causes beyond the control of the operator and it is impractical at such high speeds with the aid of manual controls to compensate therefor in a manner to insure the cutting of the pipe into sections of substantially uniform length.

For example, when the pipe is being generated at 500 F. P. M. and is to be cut to 20' sections sufficient pipe for 25 such sections is produced each minute and the saw must therefore sever the pipe 25 times each minute or at 2.4-second intervals. Now if the pipe speed should increase say to 525 F. P. M. and the saw continue to cut it at 2.4-second intervals each section instead of 20' would be 21' long and would have to be subsequently trimmed with resulting waste of a foot of pipe to produce a 20' section, while if the speed of generation should decrease to less than 500 F. P. M. the sections would be too short.

Furthermore when the pipe is moving at a given linear speed it is obvious the speed at which the saw is translated along a substantially parallel path while in contact therewith during the cutting operation must be substantially equal to that of the pipe to insure a clean cut, to avoid cobbles in the pipe and to prevent damage to the saw, and when the speed of generation of the pipe changes it is therefore essential that the speed of saw travel be correspondingly changed, as well as the timing of the successive attacks of the saw upon the pipe.

It is therefore a principal object of the invention to provide in combination with a saw movable in a closed orbit adjacent the path of a continuously generated pipe, means for automatically coordinating the motions of the saw with that of the pipe and/or compensating for fluctuations in the speed of generation of the latter whereby the saw is caused to sever the pipe into sections of substantially uniform length.

A further object is to provide in such combination means automatically operative to change the rate of travel of the saw in its orbit to compensate for changes in the rate of generation of the pipe whereby the speed of translative movement of the saw in a direction parallel to the path of the pipe while traversing a portion of said orbit is changed to correspond to the speed of pipe generation as the latter speed changes from time to time to thereby substantially eliminate relative movement in said direction between the pipe and the rotating saw while the latter is in contact with the pipe.

Other objects, purposes and advantages of the invention will hereafter more fully appear or be understood from the following description of a preferred embodiment of it, reference being had to the accompanying drawings, in which:

Fig. 4 similarly shows the same parts but in end elevation thus generally corresponding to Fig. 2, while

Figure 1:
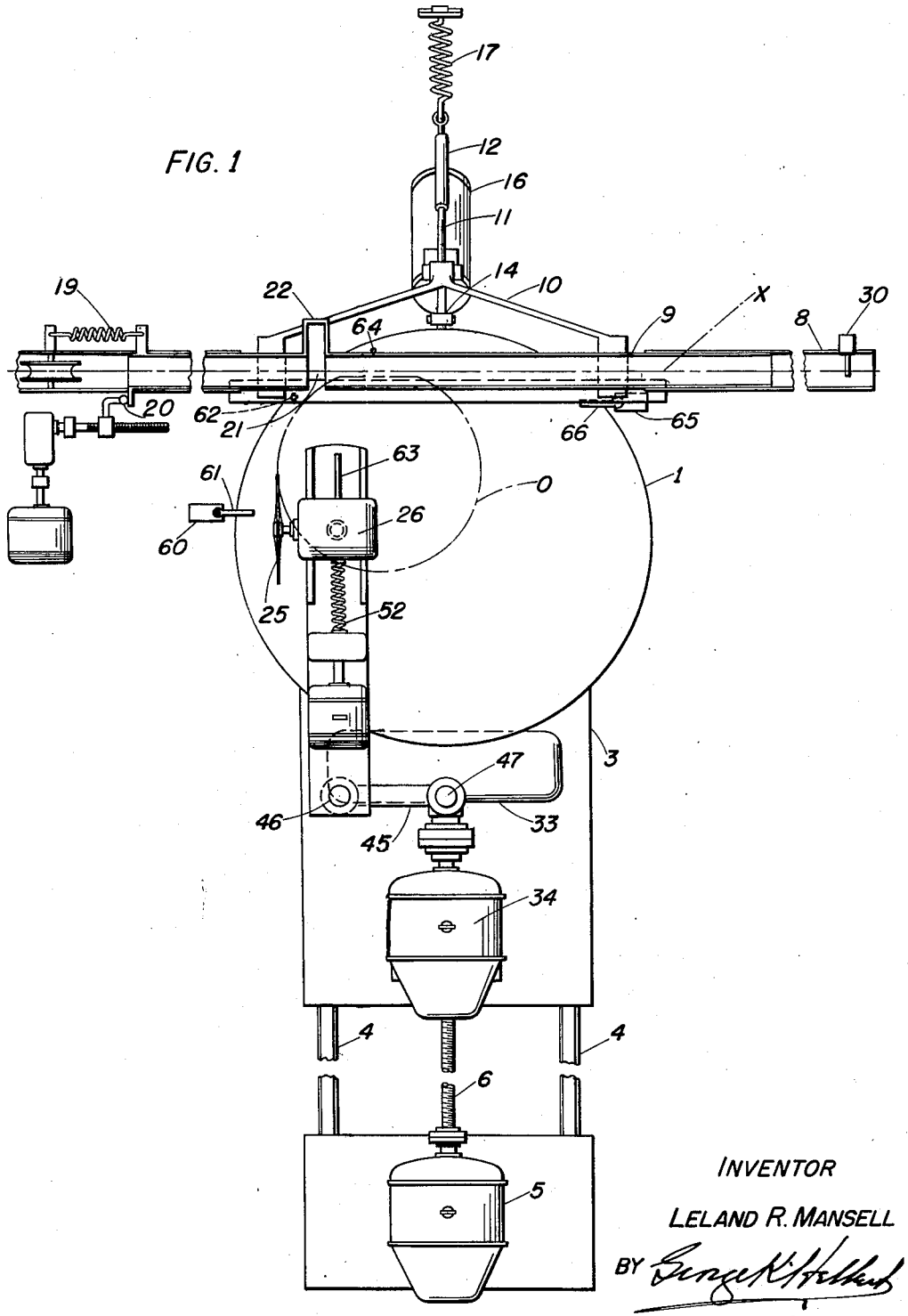
Fig. 1 is a diagrammatic top plan view of the rotating saw mechanism and associated parts as they appear just prior to attack of the saw upon the pipe.
Figure 2:
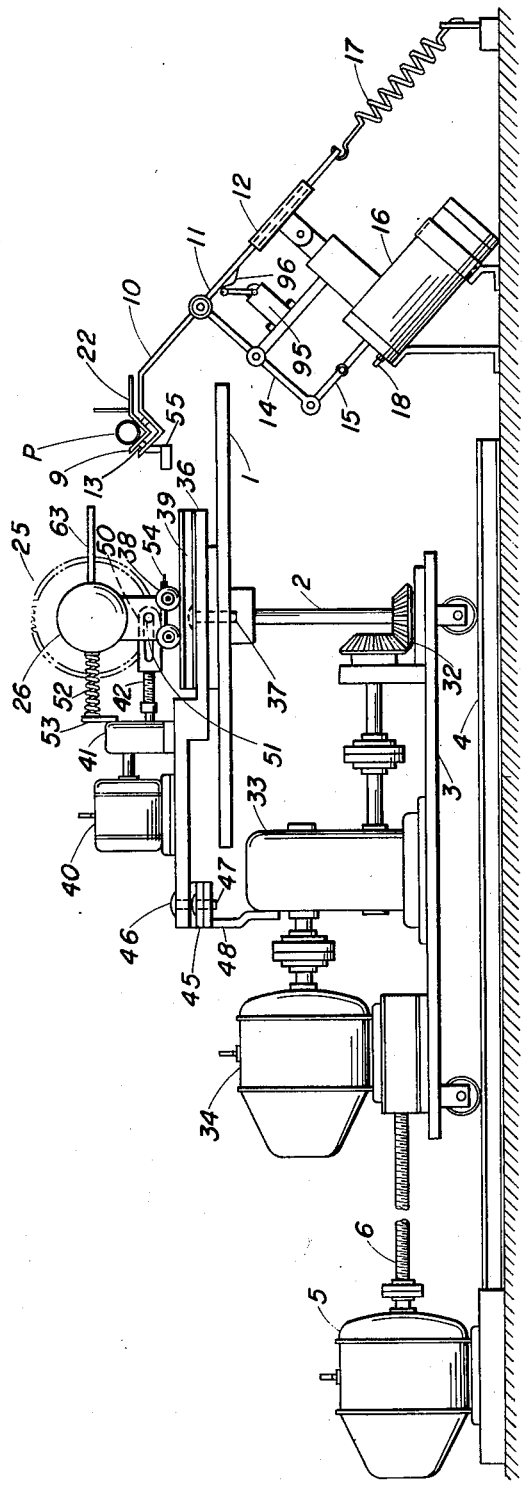
Fig. 2 is an end elevation thereof.

Referring first to the mechanical as distinguished from the electrical elements illustrated in the drawings, the saw mechanism comprises a rotatable turntable 1, carried by a vertical axle or shaft 2 supported on a movable buggy 3 from rails 4. A motor 5 driving a screw 6 provides convenient means forming no part of the invention for adjusting the position of the buggy longitudinally of the rails to properly position it with relation to the path X traversed by the pipe P as it emerges from the forming mill (not shown) and progresses along a stationary trough or conveyor 8 in which is interposed adjacent the saw mechanism a transversely movable section 9 mounted on an angularly disposed movable forked carrier 10 the stem 11 of which is slidable longitudinally in a sleeve 12. Bearings 13 at the ends of the arms of the carrier support the movable trough section 9 for limited longitudinal reciprocation in directions parallel to the path X of the pipe while a pivoted walking beam 14, actuated by a pitman 15 connected with the piston of an air cylinder 16, is operative to lift the carrier and hence the trough section transversely of the pipe path and against the bias of a spring 17 when the piston is appropriately moved, the spring returning the carrier to retracted position with the trough section 9 aligned with path X when the air is evacuated from the cylinder. A suitable valve (not shown) controls periodic admission of air under pressure to and from cylinder 16 through a connection 18 to effect the proper timed transverse reciprocation of the trough section. A spring 19 biases the latter longitudinally and holds it in retracted position (i. e. to the left in Fig. 1) in engagement with an adjustable stop 20, or returns it thereto after it has been moved therefrom longitudinally on its bearings 13 by mechanism hereinafter described, and at a suitable location trough section 9 is provided with a transverse slot 21, bridged by a yoke 22, to afford an aperture which the edge of saw blade 25 carried by table 1 can enter when the section is raised.

The pipe as it issues from the mill moves axially along the stationary trough or conveyor 8 and movable section 9, and when a cut is to be made it is shifted transversely by the latter and thus locally out of alignment with path X by operation of air cylinder 16 whereby it is periodically brought to suitable position for attack by the saw blade, the movable trough section then moving longitudinally with and at the same speed as the pipe so the saw blade, entering slot 21, can sever the latter. Along conveyor 8 in the direction of pipe travel beyond movable section 9 means (not shown) are provided for quickly accelerating the speed of movement of the severed section and a flag switch 30, the purposes of which will hereafter more fully appear, is adjustably positioned adjacent the conveyor at a suitable point for engagement by the successive leading ends of the pipe to close it, this switch automatically opening after each cut-off section, due to said acceleration, has been drawn away from the succeeding leading end of the uncut pipe and passed beyond the flag switch.

The saw table 1, which is rotated on its axis through the medium of bevel gears 32, speed reducer 33 and a variable speed motor 34, all carried by buggy 3, supports a saw carriage 36 on a pivot 37 offset from the table axis. A saw motor 26 on the shaft of which saw blade 25 is mounted is equipped with wheels 38 and is thus adapted for movement relatively to the saw carriage along rails 39 carried thereby, and a motor 40 operating a speed reducer 41 and adjusting screw 42 provides an adjustment of the positioning of the saw motor on the carriage.

As has been noted, saw carriage 36 is pivotally mounted on turntable 1 for movement relatively thereto about an axis offset from the table axis, and mechanism now to be described maintains the carriage with its longitudinal center line normal to the path X of the pipe and thus keeps the plane of rotation of the saw blade normal to said path throughout the entire cycle of table revolution. The saw carriage thus in effect partakes of a substantially planetary revolution about the table axis and carries the rotating saw blade in a generally corresponding orbit O which in the general type of saw now being discussed is normally circular. However, in the saw herein illustrated means are provided whereby during that part of each cycle in which the saw motor and blade are adjacent the pipe path, that is, just before, during and just after the cut, the blade is diverted to a rectilinear path.

Figure 3:
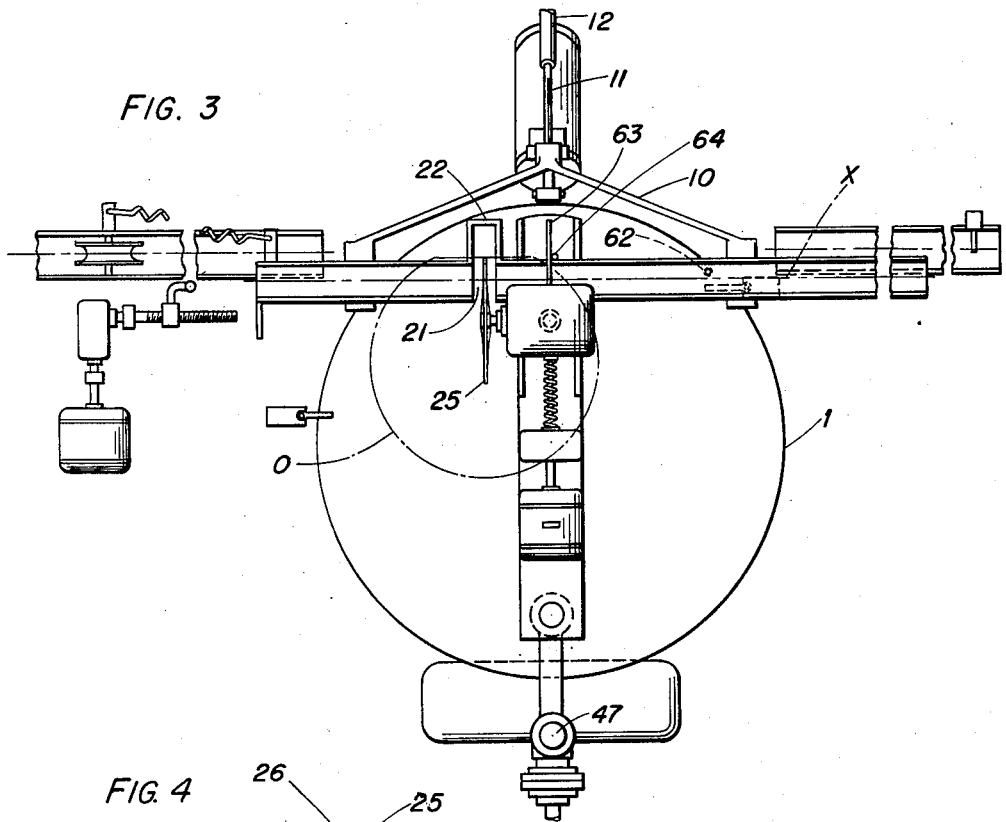
Fig. 3 is a diagrammatic fragmentary top plan view corresponding to a portion of Fig. 1 but showing the positions of the several parts just as the pipe is severed by the saw.
Figure 4:
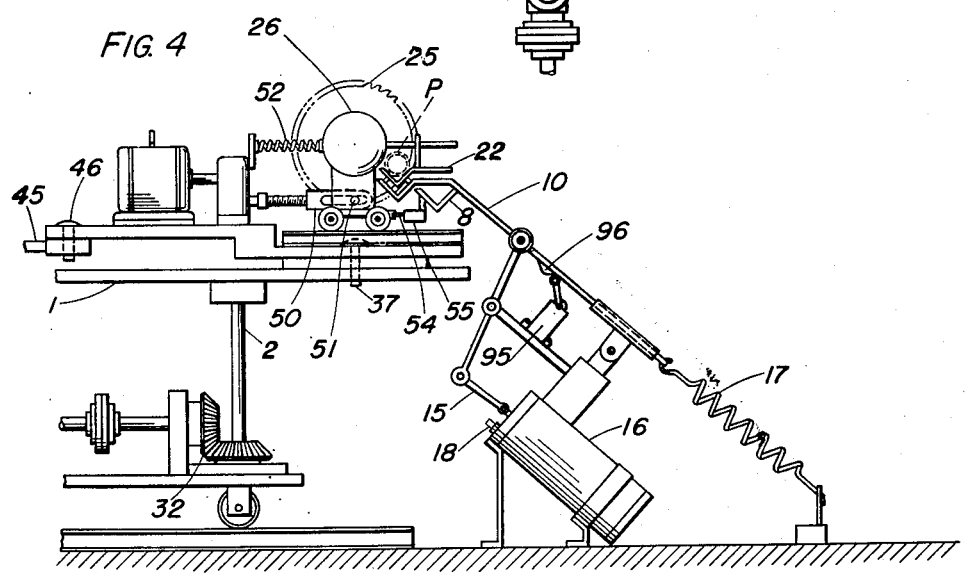

To produce the general orbital motion of the carriage 45 is pivoted at one end on a pin 46 to a rearward extension of the carriage and at the other end on a pin 47 to a fixed support 48 remote from the table and so operates to maintain the center line of the carriage, and hence the plane of the saw blade, normal to the path X of the pipe by keeping the axis of pivot pin 46 always at a constant distance from the fixed axis of pin 47, which distance is equal to the spacing of the axis of the carrier pivot 37 on the table from that of the table itself as the latter rotates clockwise in Figs. 1 and 3. The mechanism just described thus alone would be effective to move the edge of the saw blade in a circular orbit but, as has been mentioned, in accordance with improvements which I have devised this movement is converted to a rectilinear one while the blade is proximate the pipe path. To attain this result a slotted head 50 is extended from screw 42 and receives a pin 51 attached to the saw motor base while a spring 52 compressed between the motor and an abutment 53 on reducer 41 is effective to constantly urge the motor toward the pipe path within the limit defined by the slot although the motor is capable of moving in the opposite direction against the bias of spring 52 and hence toward motor 40 when a cam follower 54 projecting outwardly from the base of motor 26 engages an elongated cam bar 55 fixed to the stationary trough 8. This engagement of cam follower 54 with cam 55 occurs once during each revolution of table 1 and causes the saw motor and blade to travel in a rectilinear path as distinguished from a circular one during a part, preferably about 46°, of each such revolution of the table. It results that the saw blade edge in addition to rotating on its own axis, coincident with that of the shaft of the saw motor, thus partakes of a compound motion, namely, of revolution about the table axis, rotation about the pivotal axis of the saw carrier on the table and, through preferably about 46° of the table travel, a longitudinal motion relatively to the carrier and hence a rectilinear one relatively and parallel to the path X, and it is during this rectilinear movement that by operation of the movable trough section and its actuating mechanism the pipe is presented to the saw.

For presenting the pipe to the saw in properly timed relation with its movements periodic introduction of air to cylinder 16 is effected through the instrumentality of electrical control elements which may be of any suitable character and require no illustration, being adapted to be energized by an electrical circuit including the contacts of a switch 60 actuated by a switch arm 61 which normally extends into the path of a trip 62 positioned adjacent the edge of the saw table and carried thereby. The angular relations of the switch with respect to the path of the pipe and of the trip with respect to the saw are preferably such that, taking into consideration the inevitable time lag between closing of the switch contacts and the raising of the movable trough section 9 resulting from admission of air to cylinder 16, the trough is fully raised just as or a very little after cam follower 54 engages cam 55 to initiate the rectilinear travel of the saw. At or about the same time a bar 63 projecting forwardly from saw motor 26 engages a stud 64 projecting upwardly from the movable trough section whereby the latter is slid longitudinally on its bearings 13 as the edge of the saw blade is received in slot 21 to sever the pipe, the speed at which the trough section is thus slid of course corresponding exactly to the rate of longitudinal travel of the saw and motor, so the slot is kept in registry with the saw until, after the cut has been made, the bar is disengaged from the stud and releases the trough section for return movement under the influence of its spring 19. Concurrently with this release of the trough section, however, the air pressure in cylinder 16 is relieved by operation of suitable mechanism (not shown) controlled by a circuit including contacts of a switch 65 actuated by an arm 66 adapted to be engaged by trip 62 as it is carried past this switch by table 1, and the movable trough section therefore retires transversely under the influence of its spring 17 as spring 19 draws it back longitudinally to inactive position in engagement with stop 20.

The mechanism thus far described is known and is well adapted for satisfactorily severing pipe sections of uniform length when the pipe is issuing at a contsant speed from the mill and the saw is moving at a constant correlated speed in its orbit, but it will be recognized that any change in the speed of the pipe requires, if the length of the severed sections is to be substantially constant, a corresponding and substantially simultaneous change in the speed of the saw table since this speed determines the timing of the cycles of operation of other elements as has just been described.

The factors which normally affect the speed of generation of pipe from a continuous mill are not such as may be relied upon directly and correspondingly to affect the table speed, however, since even when the main mill driving motor is accurately maintained at a constant speed, unavoidable variations in skelp temperature, its thickness and the like often cause marked changes in the rate at which the formed pipe issues from the mill.

Consequently the means I have devised for controlling the table speed to compensate for such variations are independent of the main mill drive and instead of being coordinated with the speed of the latter as in prior control apparatus with which I am familiar are directly subject to the influence of the speed of the pipe issuing from the mill and are operative to control in accordance with that speed the speed at which the saw table rotates, and hence the speed and timing of the saw travel in its closed orbit as well as the operation of other elements actuated from or influenced by the rate of rotation of the table.

Figure 5:
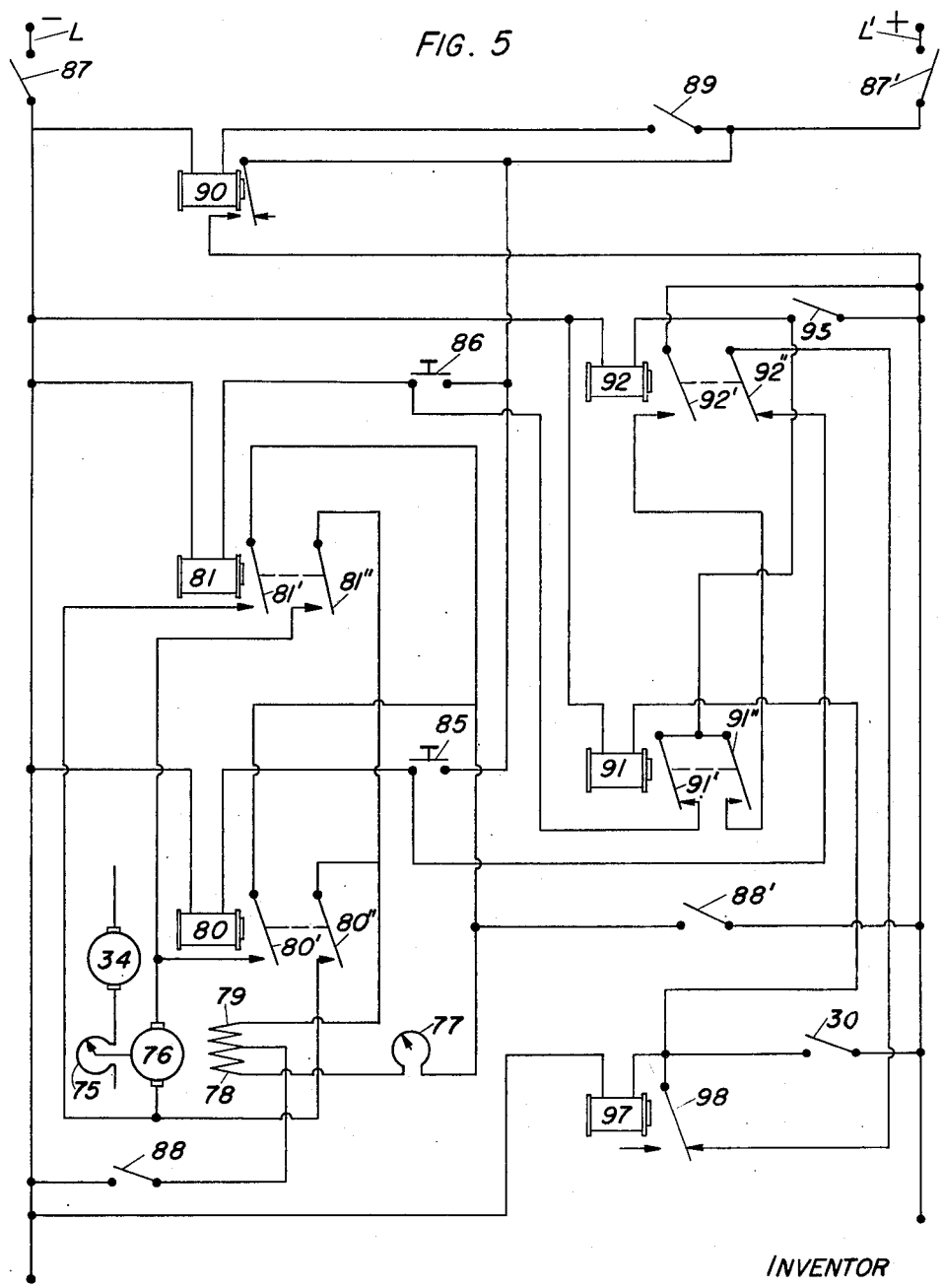
Fig. 5 is a wiring diagram of electrical elements and connections in the control system.

For the purpose of effecting such control I provide the circuits shown in the wiring diagram of Fig. 5 in which conventional symbols are used to indicate certain elements not otherwise illustrated, but which may be of any suitable character adapted for the performance of their respective functions. These include a motor driven rheostat 75 in circuit with the table driving motor 34 operative to increase or decrease the rotative speed of the latter as the rheostat is moved in one direction or the other by its driving motor 76, which is a reversible one, preferably compound wound, and having a manually operated rheostat 77 in series with its shunt field 78 whereby its speed may be adjusted manually. Motor 76 operates only to change the speed of the table motor 34 as in response to a change in pipe speed and thus normally only intermittently, remaining at rest during periods when the table speed and pipe speed are constant and exactly correlated. As a practical matter, however, such periods of rest are usually of but relatively short duration and may be of but infrequent occurrence as the numerous factors which may affect the speed of generation of the pipe and the high speed range of modern continuous mills combine to render it substantially impossible to keep the speed of pipe generation constant very long without some increase or decrease from either a temporary of a relatively persistent cause.

Accordingly the circuits illustrated in Fig. 5 which function primarily to control the operation of motor 76 and to drive it in one direction or another as required by circumstances are frequently brought into play to compensate for a change in the speed at which the pipe issues from the mill by adjusting the speed of rotation of the saw table to exact correlation therewith; these circuits include in series with the motor armature and its series field 79 a pair of relays respectively comprising electrically energizable solenoids 80, 81 and pairs of switch contacts 80', 80" and 81', 81" connected in the motor circuits in such manner that one pair may close to energize the motor in one direction from power leads L, L' and the other pair to energize it therefrom with opposite polarity and thus reverse its direction of operation. For example, relay 80 may energize it in the direction to so change the setting of rheostat 75 as to increase the speed of table motor 34 and thereby cause the saw to attack the pipe at more frequent intervals and produce shorter sections than before the setting was changed and this relay may therefore be referred to as the "shorter" relay, while relay 81 having the opposite effect on motor 76 and hence on rheostat 75 and table motor 34 may be termed the "longer" relay since through its operation the length of the sections being cut is increased.

The circuits for these relays are arranged to selectively and individually energize one or the other automatically as required to effect the necessary changes in the speed of rotation of the saw table, while the relay contacts are so connected with motor 76 and its leads that if both relays should be energized simultaneously the motor armature will not be energized and rheostat 75 will not be moved in either direction. To afford manual control of the rheostat setting, for example as when starting the saw, I provide push button switches 85, 86 respectively adapted to energize the solenoids of relays 80, 81 from the main power leads L, L' when the main circuit control switches 87, 87' are closed while switches 88, 88' controlling the circuits through motor 76 are connected across power leads L, L' and a switch 89 is provided to energize a relay 90 to connect across said leads the circuits which afford automatic control of the longer and shorter relays.

These automatic circuits include another pair of relays 91, 92 having contacts 91', 91'', 92', 92'' respectively connected with the energizing circuits for the solenoids of the shorter and longer relays 80, 81 whereby when relay 91 is energized while relay 92 is de-energized the shorter relay 80 is in turn energized but is immediately de-energized upon subsequent energization of relay 92; the latter likewise is energized simultaneously with longer relay 81 which is subject to corresponding control by relay 91. When relays 91, 92 are energized simultaneously, however, neither the shorter nor the longer relay is activated and motor 76 remains de-energized. The timing and sequence of operation of relays 91, 92 thus are instrumental in controlling the speed of the saw table and these relays are in turn responsive to the operation of switches 30 and 95 associated with the pipe handling mechanism whereby they are energized either sequentially in a manner appropriate for changing the table speed in the required direction when a pipe section cut by the saw proves to be longer or shorter than that which the apparatus is set to produce or are energized simultaneously when no change in saw table speed is required.

More specifically, the solenoid of relay 91 is in circuit with flag switch 30 and is energized thereby as successive leading ends of the pipe section engage it while moving along the stationary trough after passing the saw table, but is de-energized as the flag switch opens when the trailing end of a section, accelerated along the trough as heretofore explained, passes the flag switch ahead of the leading end of the succeeding section. The flag switch may be positioned for engagement by a pipe end before, after or just as the saw attacks the pipe but its contact shoult be closed thereby simultaneously with closing of switch 95 associated with the trough elevating mechanism when severance of the pipe section to the proper length has just occurred or is about to occur under existing conditions.

The solenoid of relay 92 is connected in series with switch 95 which is actuated by a dog 96 carried by stem 11 of the movable pipe trough carrier 10, and from Fig. 5 it will be evident contacts 91'' and 92' of relays 91, 92 are so interconnected that whenever relay 91 is first energized by closing of flag switch 30 and switch 95 thereafter closes to energize relay 92, switch 95 can then again open without de-energizing relay 92, which under these conditions remains energized until relay 91 is subsequently de-energized. However this effect of relay 91 upon relay 92 is not reciprocated by the latter upon the former as the only connection through which the solenoid of relay 91 can be energized is the one controlled by flag switch 30 and that solenoid is kept energized only when the flag switch is closed and is normally de-energized as soon as the latter opens.

As a safety device I provide a delayed action solenoid relay 97 having a contact 98 connected with contact 92'' of relay 92 the effect of which is to open the circuit through shorter relay 80 an appreciable period after closing of flag switch 30 in the event of failure of relay 92 to become energized within a reasonable time thereafter; this prevents indefinite operation of motor 76 to reduce the speed of the table motor on faulty operation of flag switch 30 or the occurrence of other mishap.

Under normal conditions of operation when the apparatus has been adjusted for cutting pipe sections of the desired length on the basis of the pipe being extruded from the mill at a given speed and the pipe then actually issues from the mill at that speed, the leading end of the pipe contacts flag switch 30 to close it simultaneously with the raising of movable trough section 9 and closing of switch 95; it results that the circuits just described fail to energize motor 76 in either direction, and the table motor therefore continues to operate at a speed corresponding to said given pipe speed. But if some change in operating conditions or the like causes the pipe to issue from the mill more rapidly and thus results in the leading end of a pipe section reaching flag switch 30 too soon so the next section will be cut longer than it should be, the switch closes to energize relay 91 before relay 92 has been energized. The shorter relay 80 is thereupon energized to operate motor 76 in a direction to increase the speed of rotation of the table and thereby cause it to attack the pipe at an earlier point in the succeeding cycle and cut the succeeding pipe section to a shorter length, that is, more nearly if not exactly to the desired one. If the resulting increment of adjustment of rheostat 75 by motor 76 has been insufficient to bring the table to proper speed, after the leading end of the succeeding pipe section closes the flag switch there will be another interval before relay 92 is energized and motor 76 will again be energized in the same direction to further increase the speed of the table and thus by gradual increments, which as a practical matter ordinarily occupy but a relatively short period of time, its speed is brought again to exact correspondence with the new and higher pipe speed.

On the other hand, if the pipe speed should decrease from that with which the apparatus is then coordinated and so cutting sections of the desired length, trip 62 will close switch 60 to actuate the movable trough too soon, and switch 95 therefore closes before the leading end of the pipe has reached flag switch 30 so that relay 92 is energized first and switch 95 simultaneously energizes longer relay 81 to drive motor 76 in the reverse direction and reduce the speed of the saw table until subsequent closing of the flag switch energizes relay 91 to interrupt the circuit through its contact 91' and the solenoid of relay 81. If the interval between the operation of the movable trough and closing of flag switch 30 is insufficient to allow the longer relay to keep motor 76 energized long enough to make the entire adjustment necessary to bring the table speed into correspondence with that of the pipe and thereby sufficiently readjust the timing of the succeeding attack of the saw, a similar but smaller interval occurs between the operations of the two switches in the next cycle whereby a further adjustment of the table speed is effected until it is likewise again brought to exact correspondence to the new and lower pipe speed. Normally of course the fluctuations in speed of pipe travel are relatively gradual and of small magnitude and thus usually are compensated for by one or two automatic operations of motor 76 in the manner described so that even at extremely high speeds very few pipe sections materially departing from the desired length are produced as a consequence of said fluctuations.

Thus it is evident apparatus embodying this invention is capable of fully automatic operation and almost instantly responsive to compensate for any change in the speed at which the pipe issues from the mill, thereby insuring substantial uniformity in the length of all pipe sections severed by the saw without regard to changes in the rate of generation of the pipe and without causing faulty cuts, cobbles in the pipe and/or damage to the saw blade. This results primarily from the ability of my apparatus to so control the saw that even when the actual speed of generation of the pipe differs from that which theoretically corresponds to the speed at which the mill is operating, the saw while in contact with the pipe and rotating in a plane normal thereto progresses in a direction parallel to that in which the pipe is moving and at substantially the same speed, the saw being translated preferably in a rectilinear path forming part of its closed orbit, although it will be apparent my control is applicable as well to a saw traveling constantly in a truly circular orbit.

While I have herein described one embodiment of the invention with considerable particularity it will be understood that numerous changes and modifications in the form, construction, arrangement and relationship of the parts of the saw table and in the electrical elements and circuits employed for controlling its operation as well as that of the pipe moving mechanism will readily occur to those skilled in the art and may be made if desired without departing from the spirit and scope of the invention as defined in the appended claims.

Having thus described my invention, I claim and desire to protect by Letters Patent of the United States:

1. In combination with a rotating saw movable in a closed orbit intersecting the path of a continuously generated elongated moving object adapted when moving in its orbit and into said path to sever the object consecutively into sections and means for moving the saw in its orbit, means operative to control the speed of said saw moving means to thereby control the timing of successive attacks by the saw upon the object and the relative motion of the saw in its orbit with respect to the object, a reversible motor operable to actuate said control means to increase and decrease said speed, a power circuit including said motor and separate means responsive respectively to the timing of each attack of the saw upon the object and to its rate of progression along its path for energizing the motor to turn in one direction under one closed circuit condition and in the other under another such condition in correspondence to the order of the responses of said last mentioned means and to maintain the motor de-energized when said responses are simultaneous.

2. In combination with a rotating saw movable in a closed orbit intersecting the path of a continuously generated elongated moving object adapted when moving in its orbit and into said path to sever the object into successive sections and means for moving the saw in its orbit, means operative to control the speed of said saw moving means to thereby control the timing of successive attacks by the saw upon the object and the relative motion of the saw in its orbit with respect to the object, a reversible motor operable to actuate said control means to increase or decrease said speed, a power circuit including said motor and separate means responsive respectively to the timing of each attack of the saw upon the object and to contact by the leading end of the object as it moves along its path to thereby energize said motor in one direction under one closed circuit condition or in the other under another such condition in correspondence to the order of the responses of the last mentioned means thereby to decrease the speed of the saw moving means should the saw commence its attack before said leading end makes said contact and to increase said speed if commenced after such contact is made.

3. In combination with a saw assembly adapted to cut into sections a longitudinally moving elongated object and including means for moving the saw in a closed orbit intersecting the path of the object and means adapted selectively to increase and decrease the speed of the saw moving means to thereby accelerate and decelerate the travel of the saw in its orbit, a power circuit including means in said path responsive to contact by the leading end of the object for actuating the speed increasing means when said contact occurs after attack by the saw upon the object, and other means in the circuit responsive to the position of the saw relatively to the path of the object during its attack thereon for actuating the speed decreasing means when said other means respond before said contact, and means for maintaining said circuit open when both said contact responsive and said other means respond simultaneously in each cycle of operation of the saw.

4. In combination with means for moving an elongated object longitudinally along a substantially rectilinear path, means periodically operative to successively move spaced portions of the object transversely out of said path and thereafter return them thereto, and means for successively severing each of said portions while so moved out of said path comprising a saw movable adjacent said path and means including a prime mover for moving the saw, means operative selectively to increase or decrease the speed of said prime mover, means operative to activate said speed changing means in one direction, means operative to activate the speed changing means in the other direction, means actuated by said periodically operative means for energizing one of said activating means, means actuated by successive leading ends of the object for energizing the other of said activating means, and means for maintaining both said activating means deenergized when said energizing means are actuated simultaneously.

5. In means for controlling the speed of movement of a saw movable in a closed orbit, means supporting the saw for movement in said orbit, a motor for moving the saw therein, a relay, means for energizing said relay in timed relation with the progression of the saw in said orbit, a second relay, means for energizing the second relay in timed relation with the progression along a rectilinear path adjacent said orbit of an elongated object to be severed by the saw, a rheostat having a member movable in opposite directions for selectively increasing and decreasing the speed of said motor, a reversible motor for moving the rheostat member and a power circuit including said motor and said relays operative to energize said motor in one direction when the first of said relays is energized before the second thereof and in the opposite direction when the second relay is energized before the first and for maintaining the motor de-energized when said relays are energized simultaneously during each revolution of the saw in its orbit.

6. In means for controlling the speed of movement of a saw movable in a closed orbit, means supporting the saw for movement in said orbit, a variable speed motor for moving the saw therein, a relay, means for energizing said relay in timed relation with the progression of the saw in said orbit, a second relay, means for energizing the second relay in timed relation with the progression along a rectilinear path adjacent said orbit of a continuously generated elongated object to be severed by the saw, a rheostat in circuit with said variable speed motor having a member movable in opposite directions for selectively increasing and decreasing the speed of said motor, a reversible motor adapted to actuate the rheostat member, means connected with each of said relays for energizing the reversible motor respectively in one direction or the other in correspondence to priority in sequential energization of said relays to thereby increase or decrease the speed of said variable speed motor and also adapted to maintain the reversible motor deenergized when said relays are energized simultaneously and means respectively selectively operable for energizing said motor in one direction or the other independently of the operation of said relays.

7. In means for controlling the length of sections successively severed from a longitudinally moving elongated object by a rotating saw moving in a closed orbit in a plane paralleling the path of the object, means supporting the saw for movement in said orbit, means for maintaining the average rate of progression of the saw in a direction parallel to said path in a portion of said orbit substantially equal to the rate of movement of the object and comprising a variable speed motor for moving the saw in its orbit, a power circuit including said motor, a switch intermittently actuated from the motor in timed relation with said movement of the saw, a second switch actuated from successive leading ends of the object, means operable selectively in opposite directions to change the speed of said motor, a reversible motor operable to actuate said speed changing means, means interconnected with the first switch operative when it is closed before the closing of the second switch to cause the reversible motor to run in one direction, means interconnected with the second switch operative when it is closed before the closing of the first switch to cause said motor to run in the opposite direction, and means interconnecting both said last mentioned means for maintaining said reversible motor to run stationary when the switches are closed simultaneously.

LELAND R. MANSELL.

REFERENCES CITED

The following references are of record in the file of this patent:

UNITED STATES PATENTS

| Number | Name | Date |
|---|---|---|
| 1,222,547 | Jackson | Apr. 10, 1917 |
| 1,862,354 | Winnie | June 7, 1932 |
| 1,946,926 | Barton | Feb. 13, 1934 |
| 2,075,095 | Cordes | Mar. 30, 1937 |
| 2,170,255 | Sheperdson | Aug. 22, 1939 |
| 2,211,362 | Bennett | Aug. 13, 1940 |
| 2,332,013 | Rudert et al. | Oct. 19, 1943 |
| 2,340,870 | Edwards et al. | Feb. 8, 1944 |
| 2,395,562 | Mansell | Feb. 26, 1946 |
| 2,512,204 | Gould | June 20, 1950 |